United States Patent [19]

Kanemoto et al.

[11] Patent Number: 5,380,459
[45] Date of Patent: Jan. 10, 1995

[54] LIQUID CRYSTAL DISPLAY DEVICE WITH IMPROVED VIEWING ANGLE DEPENDENCE OF COLOR

[75] Inventors: Akihiko Kanemoto; Haruo Iimura, both of Yokohama; Yasuyuki Takiguchi, Kawasaki, all of Japan

[73] Assignee: Ricoh Company, Ltd., Tokyo, Japan

[21] Appl. No.: 687,502

[22] Filed: Apr. 19, 1991

[30] Foreign Application Priority Data

Apr. 20, 1990 [JP] Japan ................... 2-104610
May 11, 1990 [JP] Japan ................... 2-122283
Jul. 12, 1990 [JP] Japan ................... 2-184978

[51] Int. Cl.$^6$ ............... C09K 19/52; C09K 19/56; G02F 1/13
[52] U.S. Cl. ................... 252/299.01; 252/299.4; 359/73; 359/93; 359/94; 359/96; 359/106
[58] Field of Search ................... 252/299.01, 299.4; 359/73, 93, 94, 95, 96, 103, 104, 106

[56] References Cited

U.S. PATENT DOCUMENTS

| | | | |
|---|---|---|---|
| 4,080,046 | 3/1978 | Nishizaki | 350/347 R |
| 4,385,806 | 5/1983 | Fergason | 359/73 |
| 4,443,065 | 4/1984 | Funada et al. | 359/93 |
| 4,466,702 | 8/1984 | Wiener-Avnear et al. | 350/347 R |
| 4,533,214 | 8/1985 | Penz et al. | 350/337 |
| 4,701,028 | 10/1987 | Clerc et al. | 350/347 E |
| 4,844,569 | 7/1989 | Wada et al. | 350/347 E |
| 4,904,058 | 2/1990 | Kato et al. | 359/53 |
| 4,909,606 | 3/1990 | Wada et al. | 350/347 E |
| 4,936,654 | 6/1990 | Suzaki et al. | 350/347 E |
| 4,957,349 | 9/1990 | Clerc et al. | 350/347 R |
| 4,973,137 | 11/1990 | Kozaki et al. | 350/347 R |
| 4,984,873 | 1/1991 | Takiguchi et al. | 350/337 |
| 4,995,704 | 2/1991 | Yamamoto et al. | 350/347 R |
| 5,016,988 | 5/1991 | Iimura | 350/347 R |
| 5,039,185 | 8/1991 | Uchida et al. | 359/93 |
| 5,056,896 | 10/1991 | Iimura et al. | 359/93 |
| 5,124,824 | 6/1992 | Kozaki et al. | 359/73 |
| 5,134,507 | 7/1992 | Ishii | 359/94 |
| 5,142,393 | 8/1992 | Okumura et al. | 359/73 |

FOREIGN PATENT DOCUMENTS

| | | | |
|---|---|---|---|
| 0284372 | 9/1988 | European Pat. Off. | 350/347 R |
| 0311405 | 4/1989 | European Pat. Off. | 350/347 R |
| 0312297 | 4/1989 | European Pat. Off. | 350/347 R |
| 0341702 | 11/1989 | European Pat. Off. | 350/347 R |
| 0128319 | 8/1982 | Japan | 350/345 |
| 0159117 | 7/1987 | Japan | 350/347 R |
| 1147430 | 6/1989 | Japan . | |
| 0210934 | 8/1989 | Japan | 350/347 R |
| 0217315 | 8/1989 | Japan | 350/347 R |
| 229620 | 1/1990 | Japan . | |
| 1462978 | 1/1977 | United Kingdom | 350/347 R |

OTHER PUBLICATIONS

Iimura et al–"STN-LCD With improved Viewing Angle characteristics Using A Birefringent Film" SID 89 Digest-vol. XX–May 1989–pp. 398–401.

Primary Examiner—Shean C. Wu
Attorney, Agent, or Firm—Oblon, Spivak, McClelland, Maier, & Neustadt

[57] ABSTRACT

The present invention discloses a liquid crystal display device with improved viewing angle dependency upon contrast and color, comprising a liquid crystal cell having a pair of substrates each equipped with transparent electrodes and a liquid crystal layer positioned therebetween, polarizers disposed on opposite sides of the cell and a compensation plate disposed between at least one of the polarizers and the cell, in which at least one layer of the compensation plate is an aligned film comprising a liquid crystalline polymer or a polymer having a specific molecular structure, and a refractive index in a direction perpendicular to a plane of the film is larger than the minimum refractive index in a direction parallel to the plane.

9 Claims, 3 Drawing Sheets

LIQUID CRYSTAL DISPLAY DEVICE WITH IMPROVED VIEWING ANGLE DEPENDENCE OF COLOR

BACKGROUND OF THE INVENTION

The present invention relates to a liquid crystal display device comprising a liquid crystal cell having a pair of substrates each provided with transparent electrodes and a liquid crystal layer positioned between the substrates, a pair of polarizers disposed on opposite sides of the cell and a birefringent compensation plate disposed between the cell and at least one of the polarizers, being excellent in viewing angle compensation and color compensation and easy in manufacturing and handling.

Display modes of liquid crystal display devices so far mainly used are operated in a Twisted Nematic (hereinafter referred to as "TN") type, and have a structure in which liquid crystal molecules are twisted about 90° between upper and lower substrates, and utilize a rotation of a plane of polarization by a liquid crystal and an elimination of effect thereof upon a voltage application. Since these modes are black and white display, there are advantages that they have excellent shutter effects and their multicolor display can relatively easily be prepared by placing color filters on each of picture elements. On the other hand, as a threshold characteristic of voltage-transmittance relationship is poor, it involves drawbacks, such as, a difficulty on a time division multiplex drive, low contract in a wide display or a narrow viewing angle.

In view of the above, for improving a steepness of the voltage-transmittance relationship, a birefringent type liquid crystal display device in a broad meaning, such as Super Twisted Nematic (hereinafter referred to as "STN") mode or a Super Twisted Birefringent Effect (hereinafter referred to as "SBE") mode utilizing a birefringent effect of liquid crystal by increasing a twisted angle of the liquid crystal molecules and shifting an axis of polarization of the polarizer and an aligned direction of the liquid crystal molecules was developed, and the drawbacks was overcome. While, as an effective refractive index anisotropy, $\Delta n'$, and an optical path length, d; of the liquid crystal molecules change depending on a direction of the viewing angel, it has disadvantages that a back ground color and a contrast varies depending on a viewing angle. These disadvantages are the same with other birefringent modes than STN, such as Electrically Controlled Birefringence (ECB), Deformation of vertically Aligned Phase (DAP), Hybrid Aligned Nematic (HAN) and TN.

In case of STN, there is an additional disadvantage, that is, the background color is not achromatic because of a birefringent color. For reducing this color, it has been developed a two layer system in which two cell having twisted angle of the liquid crystal layers therein opposite to each other are laminated into a compensation cell and one of the cells is used fro driving while the other is used as a compensation plate. However, as a thickness and weight of the device are increased and the productivity is low, there exist problems of inconvenient handling and high production cost.

Although the above problems can be removed by using a compensation plate made of birefringent polymer films, as a viewing angle dependence of birefringence of the plate is large analogous to birefringent type liquid crystal display device, it has a disadvantage of narrow viewing angle.

Polymer films generally used for the conventional compensation plate are made of polymers such as polyvinyl alcohol (PVA), polycarbonate (PC), polyethylene (PE), polypropylene (PP), polyethylene terephthalate (PET) and polyether sulfon (PES), but it is almost impossible to decrease the viewing angle dependence in practical use with such films.

The viewing angle dependence of the compensation plate, can be improved when a refractive index in a direction perpendicular to a plane of the plate is made larger than the minimum value among refractive indexes with the plate [refer to Japan Display, 1989, p. 339 and Japanese Patent Application S.N. 30019 (1989)]. However, when a film made of one of general polymers as described above is stretched, there is generally a relationship:

$$n_x > n_y > n_z \text{ or } n_x > n_y \doteq n_z$$

wherein $n_x$ is a refractive indexes in a stretching direction x, $n_y$ is a refractive index in a direction y perpendicular to the direction x in the plain and $n_z$ is a refractive index in a direction perpendicular to the plane.

Structure of the general polymers described above are represented by the formulae:

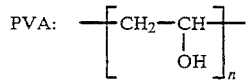

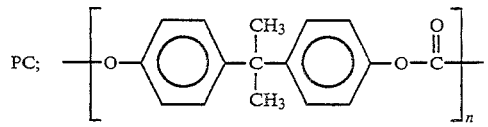

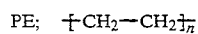

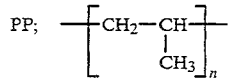

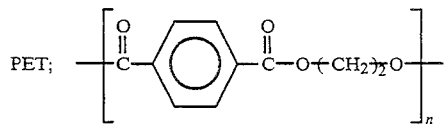

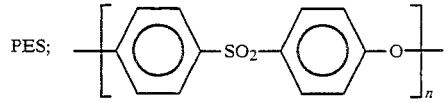

In the polymers having such chemical structures, it is understood that a refractive index is large in a direction of their main chains and the main chains are aligned in the direction of stretching, x, consequently, $n_x$ becomes the largest among the three. Further, in general monoaxial stretching, it is also considered that the polymer is stretched only slightly or not stretched substantially in the direction y, while in the direction z, it somewhat shrinks along the direction of thickness. Accordingly, the relation of the three indexes is;

$$n_x > n_y > n_z \text{ or } n_x > n_y \doteq n_z$$

Although an optical property of the compensation plate can be enhanced by improving the stretching method, it extremely difficult to change an order of the refractive indexes if a chemical structure of the polymer used is similar to that of the general polymer described above.

In the reference "Japan Display" cited before, a cell having liquid crystal molecules aligned perpendicular to a plane of the substrate is used as a compensation plate in which the refractive index in the direction perpendicular to the plane is made greater than the minimum refractive index within the plane.

However, this involves disadvantages, such as, an increased thickness of the device and difficulty to prepare such compensation plate.

The present inventors have made an earnest study for overcoming the foregoing disadvantages in the conventional liquid crystal display devices and obtaining a compensation plate which can provide an excellent effect of viewing angle compensation to a display device responding on their mode and which is easy to manufacture, and as a result, have found that a compensation plate in which a refractive index in a direction perpendicular to a plane of the plate is greater than the minimum refractive index in the plane can be obtained easily, by making at least one layer of the compensation plate out of a polymer film in which multiple bonds are present in its side chain and a number of atoms bonded between the main chain and the multiple bonds is in a range of 0 to 5, or a polymer film comprising a liquid crystalline polymer, of which liquid crystal group is aligned perpendicular to the plane and have accomplished the present invention based on the findings.

Figure 1:
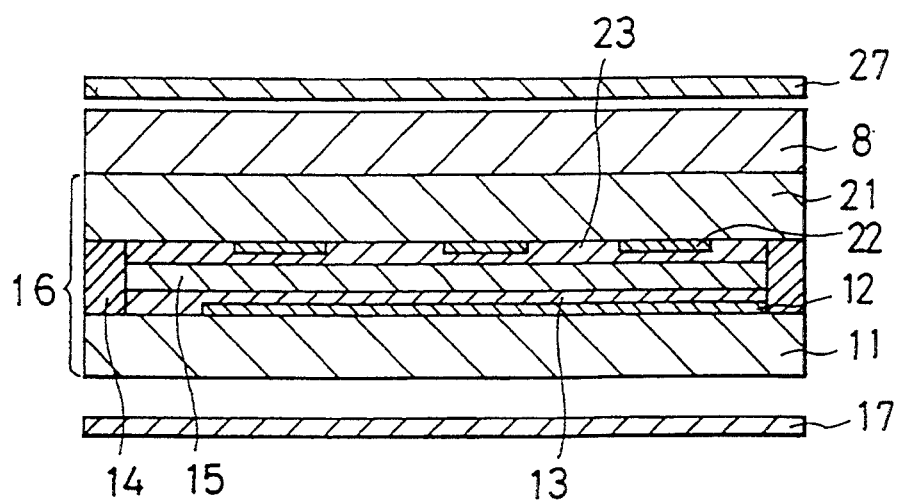
FIG. 1 is a cross sectional view of a liquid crystal display device according to the present invention.

| 8,9 | Compensation plates |
| 11,21 | Substrates |
| 12,22 | Transparent Electrodes |
| 13,23 | Aligning films |
| 14 | Sealing material |
| 15 | Liquid crystal layer |
| 16 | Liquid crystal cell |
| 17,27 | Polarizers |

SUMMARY OF THE INVENTION

An object of the present invention is to provide a liquid crystal display device using a compensation plate in which at least one layer thereof has a refractive index in a direction perpendicular to a plane of the layer being larger than the minimum refractive indexes in a direction parallel to the plane.

Another object of the present invention is to provide a liquid crystal display device having less viewing angle dependence of color, wide viewing angle, reduced thickness and light weight.

A further object of the present invention is to provide a liquid crystal display device using a compensation plate at least one layer thereof comprising a liquid crystalline polymer film in which polymer molecules are aligned in a direction perpendicular to a plane of the plate.

A further object of the present invention is to provide a liquid crystal display device using a compensation plate at least one layer thereof comprising a monoaxially stretched polymer film in which polymer multiple bonds are present in its side chain and a number of atoms bonded between the main chain and the multiple bonds is in a range of 0 to 5.

A still further object of the present invention is to provide a liquid crystal display device having a wide viewing angle using a compensation plate comprising an aligned polymer film in which a refractive index in a direction perpendicular to a plane of the plate is larger than the minimum refractive index in a direction parallel to the plane and a monoaxially stretched general polymer film, in which the refractive index in a direction perpendicular to a plane of the plane is smaller than the maximum refractive index and larger than the minimum refractive index in a direction parallel to the plane.

DETAILED EXPLANATION OF THE INVENTION

The liquid crystal display device according to the present invention comprises a liquid crystal cell having a pair of substrates each provided with transparent electrodes and a liquid crystal layer positioned between the substrates, a pair of polarizers disposed on opposite sides of the cell and a compensation plate disposed between at least one of the polarizers and the cell, in which plate at least on layer comprises an aligned film of a liquid crystalline polymer or a polymer having a specific molecular structure, and a refractive index in a direction perpendicular to a plane of the film is greater than the minimum refractive index in a direction parallel to the plane.

The present invention will now be described more concretely.

Firstly, a case of using an aligned film in which a polymer having a specific molecular structure will be described as one embodiment of the present invention.

In a polymer film used as a compensation plate of the present invention, a direction in a plain of the plate monoaxially stretched is defined as x, a direction in the plain perpendicular to the direction x as y and a direction perpendicular to the plane as z. Further, the refractive indexes in the respective direction x, y and z, are defined as $N_x$, $N_y$ and $N_z$. It is assumed that an alignment of a main chain of the polymer monoaxially stretched is largest in the direction x similar to a case of monoaxially stretched conventional polymer film. However, since the polymer used in the present invention has a multiple bond in its side chain, the refractive indexes in the directions z and y are larger than that in a direction of the main chain and therefore, there is the relation:

$$N_z > N_y > N_x \text{ or } N_z \doteq N_y > N_x.$$

Therefore, a film having quite different optical properties from those of monoaxially stretched general polymer films having larger refractive index in a direction of the main chain, for example, a stretched film of PVA, PC, PE, PP, PET, PES and the like, can be obtained.

As a typical example of the polymer for a monoaxially stretched film usable as a compensation plate of the present invention, a polystyrene or a substituted polystyrene represent by the formula (I) can be exemplified:

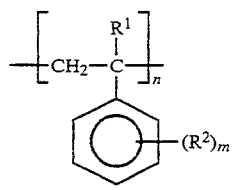
(I)

wherein $R^1$ and $R^2$ each represents a hydrogen or halogen atom, a methyl, ethyl, nitro, cyano, phenyl or naphthalene group, or each of the groups of which hydrogen atom(s) is(are) substituted with the atom or the group described above, m represents an integer of 1 to 5 and n represents a polymerization degree of the polymer which is appropriate to prepare a film. In addition, the following polymers represented by the formulae (II) through (V) having multiple bonds other than those of benzene rings in their side chains can also be exemplified:

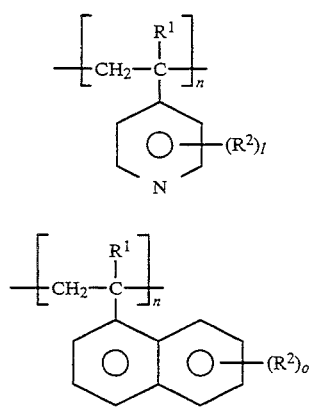
(II)

(III)

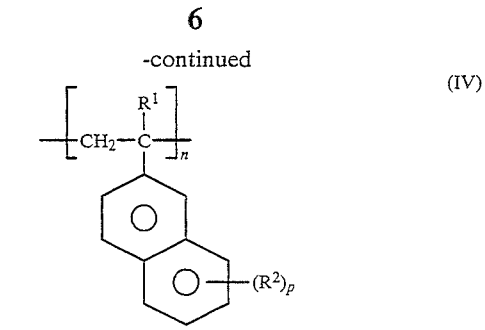
(IV)

(V)

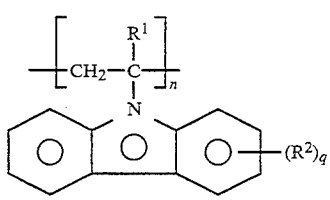

wherein $R^1$, $R^2$, m and n have the same meanings as above, l is an integer of 1 to 2, o is 1 to 7, p is 1 to 7 and q is 1 to 8. In the formulae, $R^2$ substituted at a position apart from the main chain as far as possible is preferable.

Further, a monoaxially stretched polymer film comprising a polymer represented by the formula (VI) in which methylene groups are introduced between the aromatic ring in the side chain and the main chain [in the formula, the aromatic ring is represented by a benzene ring for the sake of explanation] can be used as the compensation plate in the present invention:

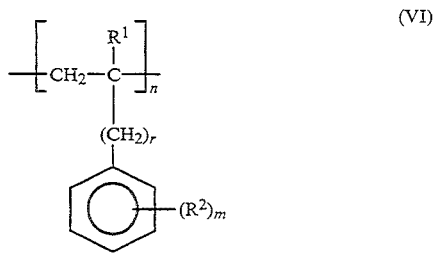
(VI)

wherein $R^1$, $R^2$, m and n have the same meanings as above, r represents an integer of 1 to 4.

In a case of the polymer represented by the formula (VI), when a plurality of methylene groups are bonded between the aromatic ring and the main chain, they represent a long methylene chain, for instance;

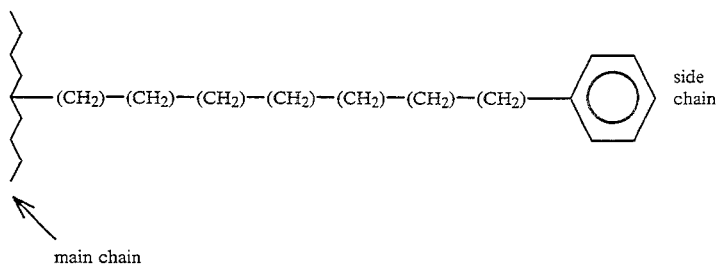

and it is not preferable since the refractive index $N_z$ in a direction perpendicular to the aligned direction of the main chain is not sufficiently large in many cases due to a flexibility of the long methylene chain.

In this case, the methylene groups bonded between the main chain and the aromatic ring mean only those bonded along the main branch of the side chain and the number of the methylene groups in side branches of the side chain, for example shown below as A, give no effect on $N_z$.

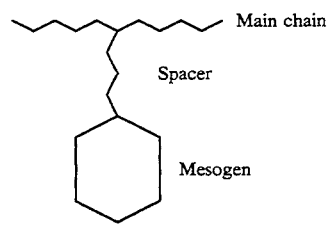

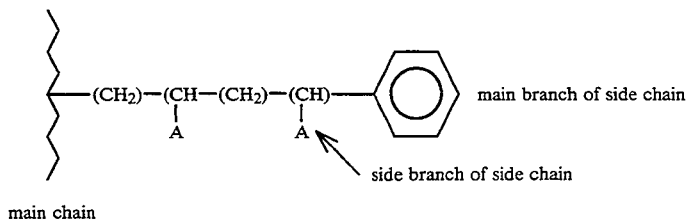

main chain

The number of the methylene groups bonded between the main chain and the aromatic ring is preferably not greater than 4 and, more preferably, not greater than 2.

The multiple bond referred to in the present invention is not limited to the multiple bond in the aromatic ring but also includes the multiple bonds in cycloaliphatic rings, such as, multiple bonds in cyclopentene or cyclohexadiene, and the multiple bonds in a linear aliphatic groups. Further, multiple bonds formed by atoms other than carbon atoms, for example, azo coupling, —N=N—, etc. may also be included. However, the multiple bonds in side branches of the side chain and multiple bond between a carbon atom and an oxygen atom, such as in carboxyl group, even if it present on the main branch of the side chain are not included.

The number of methylene groups described before is a representative example of a number of atoms just to make the description easier to understand. Therefore, the number of methylene groups in the above description should be interpreted as a number of atoms.

Accordingly, the number of atoms bonded between the multiple bond and the main chain includes other atom than carbon atom, for example, nitrogen, sulfur and oxygen, and same to the above, only the atoms in the main branch of the side chain are to be counted.

For the reference sake, the number of atoms is shown in the following formulae, as actual examples:

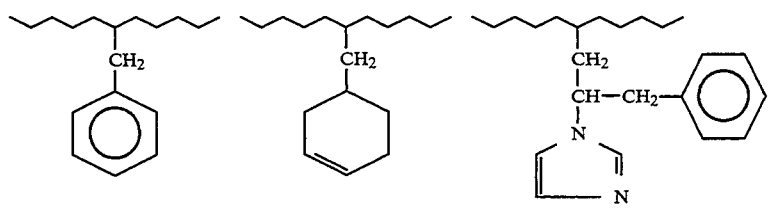

No. of atoms      2          4          4

The mesogen portion has the same structure as general liquid crystals exemplified below, many of which contain multiple bonds and can be shown as examples of the side chain of the polymers having specific structures in the present invention.

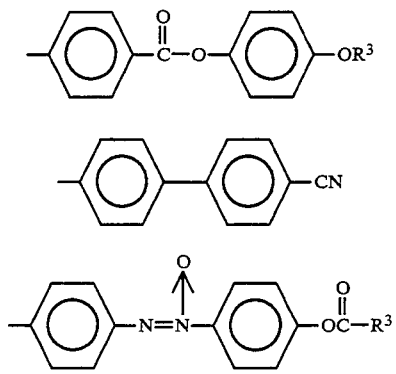

As an example of the polymer of the film used in the present invention, side chain type liquid crystalline polymers can also be mentioned in addition to the polymers represented by the formulae (I) through (VI) described above. The chemical structure of the side chain type liquid crystalline polymers can be schematically described as follow:

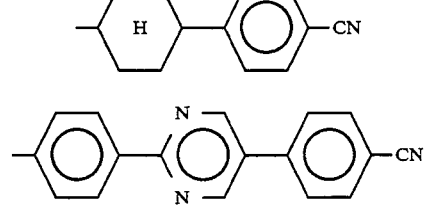

-continued

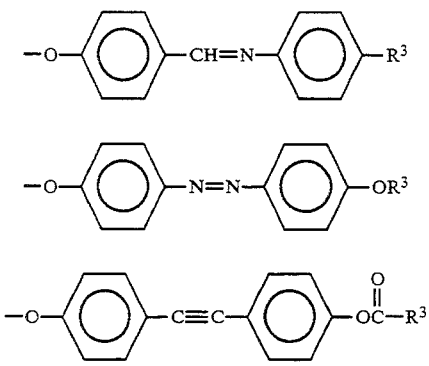

wherein $R^3$ represents a linear alkyl or alkoxy group and the number of atoms bonded in the main chain of the spacer is preferably not greater than 5.

The side chain type liquid crystalline polymers exemplified above are included in liquid crystalline polymers in a broader sense which will be described later and the polymer in which liquid crystal groups in the side chain are aligned in a direction perpendicular to the plane of the film can of course be used as the compensation plate of the present invention.

The main chain type liquid crystalline polymer films, in which liquid crystal groups are aligned in a direction perpendicular to the plane, can be used with monoaxial stretching or without stretching.

Further, a film prepared by monoaxially stretching a polymer comprising a main chain having multiple bonds as shown in the structural formula of PC, PET or PES described before and side chain having multiple bond referred to in the present invention is not preferable since a refractive index in a direction of the main chain is increased and approaches much closer to a refractive index in a direction perpendicular to the main chain. In view of these, a vinyl type polymer having multiple bonds only in the side chains such as a polystyrene, that is, a polymer represented by the formula (VII) is one of the most preferable for the compensation plate of the present invention:

(VII)

wherein n has the same meaning as described above and $R^4$ represents a group containing multiple bond. Further, a polyvinyl acetal type polymer represented by the formula (VIII) having an acetalized main chain in the vinyl alcohol is also used frequently as a compensation plate of the present invention:

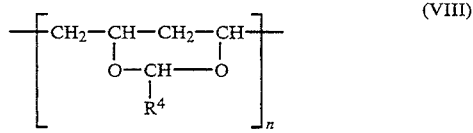

(VIII)

wherein n and $R^4$ have the same meanings as described for the formula (VII).

Hereinafter, a description will be made on a case of using a film prepared by aligning a liquid crystalline polymer for a compensation plate as another embodiment of the present invention.

In a liquid crystal operation mode generally used so far by utilizing birefringence of a liquid crystal layer, the viewing angle dependence of display properties and a viewing angle of a device can be improved by providing a compensation plate having a refractive index, $N_z$, in a direction perpendicular to a plane of the film is greater than at least one of refractive indexes, $N_x$ and $N_y$, in a direction parallel to the plane.

A compensation plate having refractive indexes adjusted as above can be prepared easily by using a film in which a liquid crystal group in a liquid crystalline polymer is aligned in a direction perpendicular to the plane in addition to the preparation by using a stretched film of a polymer having a specific structure as described above. Liquid crystalline polymers, similar to low molecular liquid crystals, has a feature that it can easily be aligned under an external power field, such as an electric field and a magnetic field, by an effect of a surface condition of the substrate contacting the film or by an external stress such as shearing.

Further, by selecting a liquid crystalline polymer having appropriate glass transition point, aligning molecules of the polymer at its liquid crystal phase forming temperature, and quenching the film below the glass transition point immediately thereafter, it is possible to immobilize the alignment once arranged in its liquid crystal phase. On the other hand, when a low molecular liquid crystal is used in a compensation plate, although it is easy to align the molecule but very difficult to maintain the alignment for a long time even an excellent aligning agent obtainable at present is used. This immobilized and stable alignment of the liquid crystalline polymers is one of the remarkable features of the polymer.

In addition, because of its solid state, the film can be used by itself without using any sandwich structure which is unavoidable when a low molecule liquid crystal is used and has to use a pair of substrates for the plate. Accordingly, a compensation plate, simple in its composition and light in its weight, can be prepared according to the present invention.

A liquid crystalline polymer can be aligned in a direction perpendicular to a plane of the film, for example, by heating a film which comprises a liquid crystalline polymer having a positive dielectric anisotropy, to a liquid crystal phase forming temperature and applying an electric field in a direction perpendicular to the plane. For applying an electric field, the film may be placed between electric conductive substrates or one or both surfaces of the film may be placed a little apart from the electric field applying electrode. The film of the liquid crystalline polymer aligned homeotropically in a liquid crystal phase and obtain also homeotropically aligned liquid crystalline polymer film in a solid phase. Above explanation is made for a case applying an electric field, but an alignment by a magnetic field can also be made in a same manner. Further, the liquid crystalline polymer film can also be obtained by using a homeotropically aligning agent in the same manner as low molecule liquid crystals. For example, by treating a substrate made of glass with a homeotropically aligning agent such as a silane compound having a long chain alkyl group [DMOAP, ODS-E manufactured by CHISSO Co.] or lecithin, placing a liquid crystalline polymer film between the treated substrates, heating them to a liquid crystal phase forming temperature, quenching upon completion of alignment and finally obtain a solid liquid crystalline polymer film aligned homeotropically. In any of the cases, the polymer film thus aligned can be used being attached to the substrates or can be used by itself being peeled off from the substrate. Alternatively, the liquid crystalline polymer can be aligned homeotropically by using a substrates only having a low surface tension such as tetrafluoroethylene in place of the substrate treated with the agent.

A term "homeotropical alignment of a liquid crystalline polymer" used in the present invention means homeotropical alignment of a main chain when a main chain type liquid crystalline polymer is used and the alignment of a side chain when a side chain type liquid crystalline polymer is used, that is, a group having a liquid crystal property is to be aligned. Further, "nearly homeotropical alignment" used in the present invention means an alignment with an angle of 75° to 90° to the surface of the compensation plate.

As the liquid crystalline polymer mentioned in the present invention, those having thermotropic property are preferable and as to a phase, those exhibiting a nematic phase or a smectic phase are preferable, but in view of easiness for obtaining uniform alignment, those exhibiting nematic phase are particularly preferable. The liquid crystal transition temperature is preferably not lower than 60° C. since the device is usually used at a room temperature. The polymer having a liquid crystal transition temperature lower than 60° C. can of course be used, but in this case it is preferable to place the polymer film between substrates taking into consideration of reduction of its self-sustainability when used at a room temperature. The thus prepared compensation plate has a greater refractive index in a direction perpendicular to a plane of the plate than conventional one and it can greatly improve a contrast and a viewing angle dependence of a background color of the liquid crystal display device, such as, STN mode or a birefringence controlling mode. Since the conventional film, such as PVA, PC and PP, has the maximum refractive index ($n_x$) in the stretching direction (x), a refractive index ($n_y$) in the direction (y) perpendicular to the direction x in a plane of the film which is large next to $n_x$ and the minimum refractive index ($n_z$) in the direction (z) perpendicular to the plane, which is substantially equal with $n_y$, by combining this film with the viewing angle compensation plate of the present invention, $n_z$ can be larger than $n_y$ as a whole.

On the other hand, if $n_z$ of the entire plates is too large, the viewing angle of the device is prone to be narrowed. It is, accordingly, preferable to have a relation: $n_x > n_z > n_y$; by combining and controlling the viewing angle compensation plate.

It is necessary for the compensation plate that it acts to reform an elliptically polarized light, having different elliptic rates and azimuth angles depending on wavelength after passing a liquid crystal cell, again into linearly polarized light.

The constitution and the function of the liquid crystal display device using the compensation plate of the present invention will now be explained referring to the attached drawings.

Figure 2:
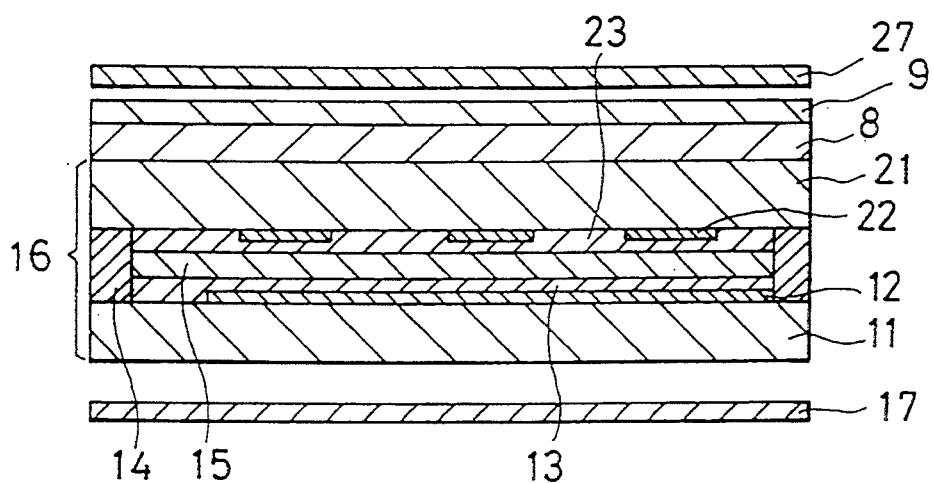
FIG. 2 is a cross sectional view of a liquid crystal display device in which a compensation plate according to the present invention and a stretched general polymer film are combined as a compensation plate.

FIGS. 1 and 2 are cross sectional views as examples of a display device constitution of the present invention, which has a similar constitution to a conventional STN type liquid crystal display device except that a compensation plate is disposed between a liquid crystal cell and a polarizer. All of the substrates used in the present invention are transparent unless otherwise specified.

A first substrate 11 and a second substrate 21 are placed face to face with a gap between them and liquid crystal is sealed in a space formed by the substrates and a peripheral sealing 14 to constitute a liquid crystal layer 15 and form a liquid crystal cell 16. The substrates 11 and 21 are made of glass or optically isotropic plastic film. Transparent electrodes 12, 22 for applying a voltage to the liquid crystal layer 15 and aligning films 13, 23 for aligning the liquid crystal molecules in a predetermined direction are disposed to the inner surface of the substrates. On opposite sides of the liquid crystal cell 16, polarizers 17 and 27 are disposed, and a viewing angle dependency compensation plate 8 of the present invention and a color compensation plate 9 prepared by stretching a usual polymer film (shown only in FIG. 2) are disposed between the cell 16 and the polarizer 27. Hereinafter, examples in which the compensation plate 8 or 8 and 9 is disposed on the liquid crystal cell will be described, but the vertical positional relationship between them can be reversed without any recognizable change.

The liquid crystal display device may also be used in a reflection type by placing a reflection plate at an outer surface of one of the polarizers. Further, as an another embodiment of the present invention, the compensation plate can also be used as a constituent element of the polarizer itself. In a general polarizer utilizing dichroism of iodine or a pigment, iodine or a pigment is adsorbed on a stretched film to provide a polarizing function and, further, the stretched film is sandwiched between other two films for protection. A birefringence layer may be positioned between the protection film near to the liquid crystal layer and the stretched film, and further said protection film can also serve as the birefringence layer. As described above, the birefringence layer used in the present invention can be placed any place between the liquid crystal layer and the polarizer.

The aligning treatment on each of the substrates in the liquid crystal display device can be controlled by applying known oblique vapor deposition or by forming an organic or inorganic layer coated on the substrate and, subsequently rubbing them, for instance, by a cotton cloth. Specifically, a coated polymer layer of polyamide or polyimide accompanied with a rubbing treatment or oblique vapor deposition of SiO, MgO, $MgF_2$ or the like thereon is used suitably.

Figure 3:
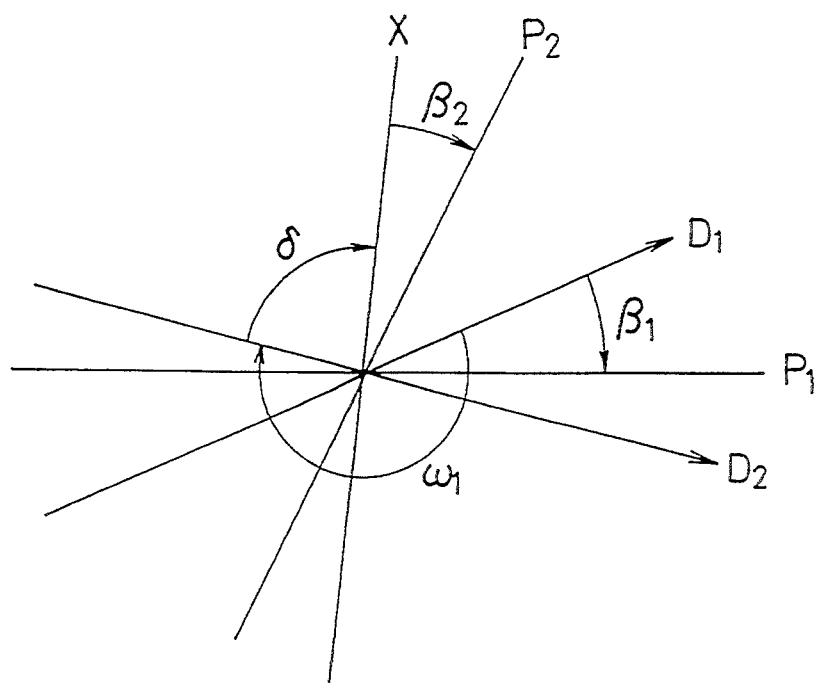
FIG. 3 is a drawing for illustrating the definitions for various angles in the present invention.

FIG. 3 shows definitions of angles in the present invention, used in STN mode. $D_1$ and $D_2$ show, respectively, directions when liquid crystal molecules on the first substrate 11 and the second substrate 21 are projected on the lower substrate 11, in which arrows show a direction of the liquid crystal molecules slightly directed upward to the substrate 11. The liquid crystal layer 15 has a structure in which the liquid crystal molecules are twisted by an angle, $\omega_1$, between $D_1$ and $D_2$. In this case, if $\omega_1$ is small, the steepness is worsened resulting to a low time-deriding characteristics.

On the other hand, if $\omega_1$ is too large, a light-scattering structure is formed when a voltage is applied and deteriorate the display quality. In view of the above, it is particularly preferable that $\omega_1$ is in a range of 160° to 360°. In FIG. 3, it is so constituted that a direction of the twisting is clockwise from the substrate 11 to the substrate 21 when viewing the cell from a side of the substrate 21. However, it can be made counterclockwise by adjusting a direction of the aligning treatment or a selection of cholesteric liquid crystals.

x denotes a direction along which the refractive index in a plane of the compensation plate becomes maximum and it has an angle of δ to the aligning direction $D_2$ of the liquid crystal molecules on the adjacent substrate 21. Further, a transmission axis $P_2$ of a polarizer 27 near to the compensation plate 9 has an angle $\beta_2$ relative to the direction x. Further, the transmission axis $P_1$ of the polarizer 17 makes an angle $\beta_1$ relative to the liquid crystal molecule aligned to direction $D_1$ on the substrate 11. The angle herein are defined positive in a twisting direction of the liquid crystal. Preferable conditions for δ are different whether a single compensation plate or a plurality of plates is used. A preferable value of δ for a single plate is −50° to 50°.

Above description have been made to the compensation plate disposed on one side of the liquid crystal cell, but it can also be disposed on both sides of the cell to sandwich the cell therebetween. A color forming when the compensation plate is disposed between the polarizers is depends on a retardation of the compensation plate and a direction of the polarizer. Further, the color change depending on the viewing angle direction dues to the viewing angle dependence of the retardation of the compensation plate. If the viewing angle dependence on the retardation of the compensation plate is small, the viewing angle dependence of color is also reduced. Accordingly, regarding the compensation plate used for the color compensation of the STN type liquid crystal display device, the viewing angle dependence of a color of the liquid crystal display device is reduced as the viewing angle dependence of a retardation of the compensation plate is small. Since the refractive index along a direction of thickness of the compensation plate is larger than the minimum refractive index in a plane of the plate, a change of color depending on the viewing angle of the compensation plate itself is small. Consequently, when the plate is combined with the birefringent mode liquid crystal display devices such as an ECB, DAP, HAN. TN or STN type, a liquid crystal display device having an extremely wide viewing angle can be obtained. Further, since the compensation plate can be prepared with a simple structure, it is possible to reduce a size and a weight of the device.

EXAMPLE

The present invention will be described more in detail refereeing to examples but it should be noted that the present invention is not limited by these Examples.

EXAMPLE 1

A liquid crystal aligning agent HL-1100 (manufactured by HITACHI KASEI Co.) was spin-coated on a glass substrate having been provided with a patterned transparent electrodes, dried in an oven at 120° for one hour and then treated with a rubbing by using a flocked nylon cloth. Two glass substrates prepared in this way were stuck in a way that surfaces coated with the aligning agent were opposed to each other to form a cell, and a liquid crystal composition comprising 99.2% by weight of nematic liquid crystals ZLI-2293 (manufactured by Merck & Co.) and 0.8% by weight of substance S-811 (manufactured by Merck & Co.) were sealed therein to prepare an STN type liquid crystal device (hereinafter referred to as "LCD") having a twisted angle of 220°.

As are well known, since birefringent color appears in the STN type LCD, birefringence was prevented by combining phase plates as described below.

Namely, a polycarbonate film was stretched to prepare phase plate with a retardation value of 300 nm $[n_x > n_y; (n_x − n_y) \times \text{thickness} = 300$ nm]. In the same manner, a polystyrene film was stretched to form a phase plate with a retardation value of 330 nm $[N_x < N_y; (N_x − N_y) \times \text{thickness} = 300$ nm].

The two phase plates were stuck together in a manner that the stretched directions of them were in perpendicular to each other and prepared a phase plate having, as a whole, a retardation value of 600 nm, which was placed between the STN type LCD described above and a polarizer to prepare an STN type LCD of a black and white display mode.

Further, for a comparison, a phase plate with a retardation value of 600 nm was prepared by stretching a polycarbonate film and prepared an another type of STN type LCD of a black and white display mode.

A color difference between a color observed from the front side $\{u^*(0), v^*(0)\}$ and a color observed from a direction having a viewing angle, $\theta, \{u^*(\theta), v^*(\theta)\}$ is defined as:

$$\Delta E^* = \sqrt{\{u^*(0) - u^*(\theta)\}^2 + \{v^*(0) - v^*(\theta)\}^2}$$

[wherein $\Delta E^*$ is a color difference and $E^*$, $u^*$ and $v^*$ are symbols defined in CIE 1976 Color Specification System]

and compared the two color differences for a certain range of viewing angles.

Figure 4:
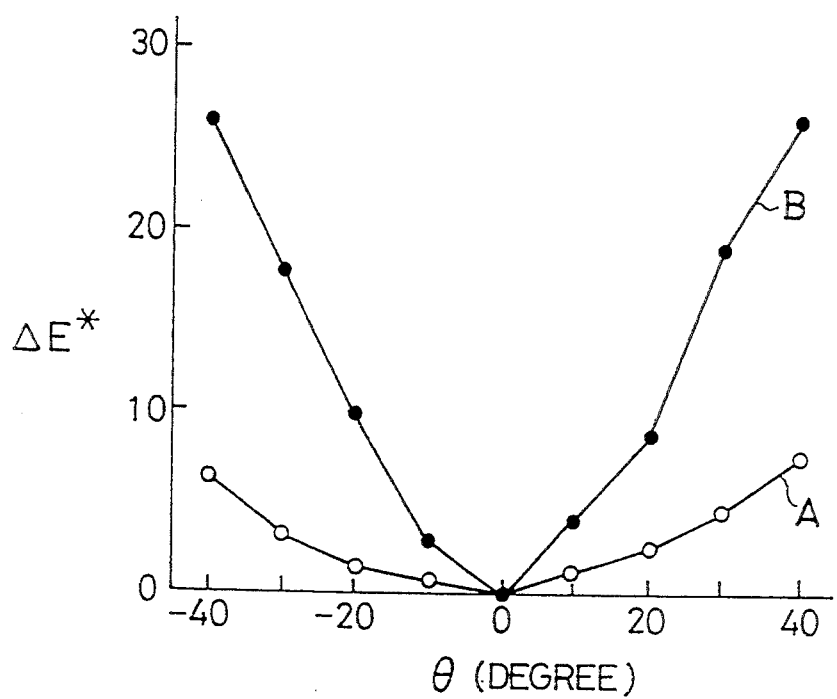
FIG. 4 is a drawing illustrating respective viewing angle dependence of retardation of a device according to the present invention and a conventional device.

The results obtained are shown in FIG. 4, in which curve A represents the plate combined polystyrene and polycarbonate films and curve B represents the plate using only polycarbonate film. It can be seen that a combination of the stretched polystyrene film and the stretched polycarbonate film gives a remarkably reduced viewing angle dependency on the color than that using only the stretched polycarbonate film.

EXAMPLE 2

A liquid crystal aligning agent JIB-31 (manufactured by NIPPON GOSEI GOMU Co.) was spin-doated on a glass substrate having pattered transparent electrodes, and dried in an oven at 120° C. for one hour. It was rubbed with a flocked cloth and two substrates prepared in this way were stuck in a manner that the rubbing directions are antiparallel each other and prepared an ECB type LCD by sealing a liquid crystal ZLI-2293 (Manufactured by Merck & Co.). Thickness of the cell was controlled by a 8 μm Myler film and a retardation value of the liquid crystal layer was controlled to be about 1.1 μm.

The cell was disposed between two polarizers in a cross-nicol arrangement so that an angle of 45° was made between a rubbing direction and a transmission axis of the polarizer and, when a voltage was applied to the electrodes, the birefringence color changed depending on a value of the voltage. When the cell was observed from an oblique direction at a constant voltage, the birefringence color changed remarkably depending on the viewing angle.

Then, two stretched polystyrene films were stuck so that the stretched directions were perpendicular each other and when they were placed between the liquid crystal cell and one of the polarizers, the viewing angle dependence of the display color was remarkable reduced as in Example 1.

EXAMPLE 3

A polysiloxane type liquid crystalline polymer film having a repeating unit represented by the formula (1) was placed between a glass substrate coated with a homeotropically aligning agent, ODS-E (manufactured by CHISSO Co.), and a teflon plate. They were heated at a temperature of 160° C., at which the liquid crystalline polymer exhibited a nematic liquid crystal phase, for one hour and quenched to a room temperature, from which the teflon plate was peeled off to obtain a film of the liquid crystalline polymer of about 2 μm thickness aligned homeotropically. Since the liquid crystalline polymer did not exhibit liquid crystal phase at a room temperature, the resultant film was in a glass phase. The film had refractive indexes of $n_z = 1.68$ and $n_x = n_y = 1.52$.

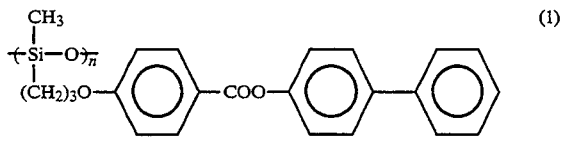
(1)

melting point: 100° C.; and nematic isotropic transition temperature: 170° C.

Figure 5:
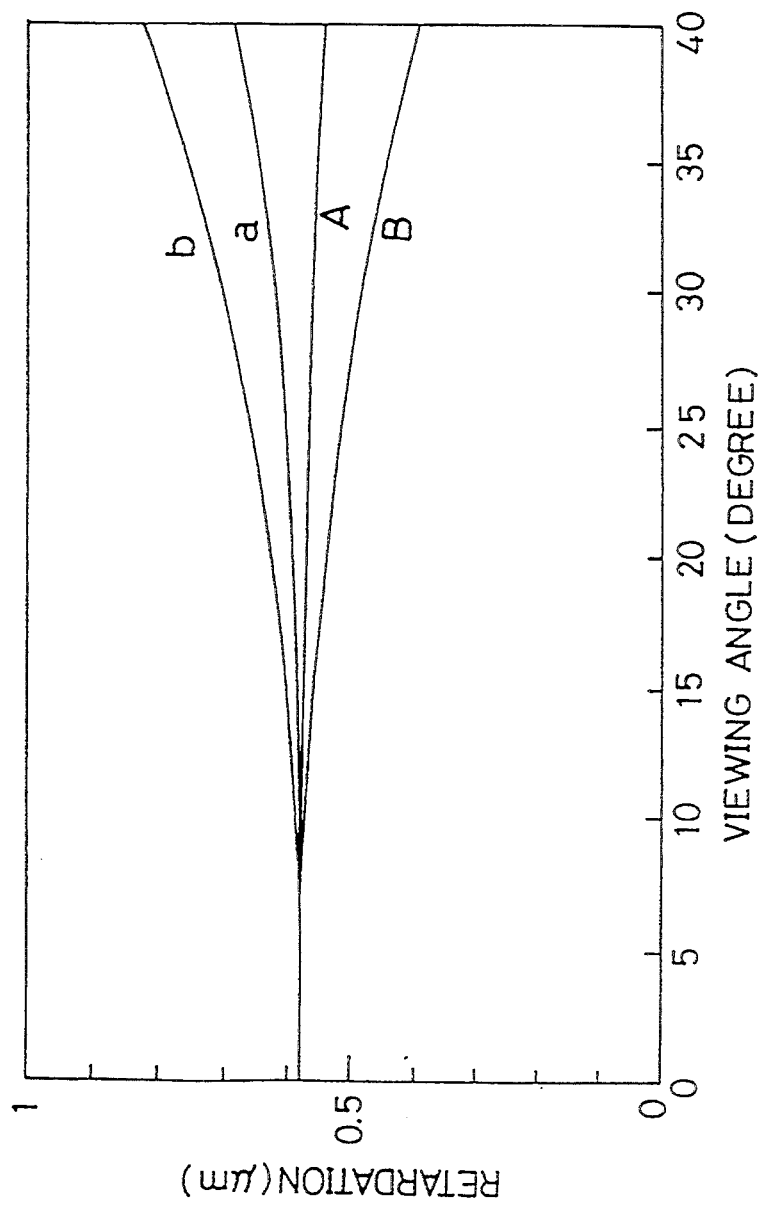
FIG. 5 is a drawing for illustrating the viewing angle dependence of color of the compensation plate according to the present invention and a conventional compensation plate.

When the liquid crystalline polymer film was superimposed on a phase plate made of a stretched polycarbonate having refractive indexes of $n_x = 1.589$, $n_y = 1.582$ and $n_z = 1.581$ and a retardation of $(n_x - n_y) \times d = 580$ nm, the refractive indexes for the entire compensation plate were $n_x = 1,588$, $n_y = 1,581$ and $n_z = 1.583$ and were $n_x > n_z > n_y$. When this combined compensation plate was placed between polarizers, which were arranged to be perpendicular each other, a viewing angle dependence of the retardation was measured, change of retardation due to viewing angles was scarcely observed as shown with A and a in FIG. 5. The viewing angles in FIG. 5 are angles from a direction of normal line and A shows a retardation observed from a direction x of the compensation plate while a shows that of observed from a direction y of the plate.

The compensation plate was then disposed between the STN type liquid crystal cell and the polarizer similar to FIG. 2, and prepared a liquid crystal display device according to the present invention. This liquid crystal cell was constituted as described below.

An STN cell, in which a twisted angle $\omega_1$ of liquid crystal was 200° between upper and lower glass substrates and the retardation of the liquid crystal layer (a product of a birefringence anisotropy of the liquid crystal molecules and a thickness of the liquid crystal layer) was 0.92 μm, was prepared. The liquid crystal used were prepared by adding chiral nematic liquid crystal S-811 to nematic liquid crystals ZLI-2293 having a positive dielectric anisotropy. The aligning treatment was conducted by applying a rubbing treatment to a polyimide film.

At a lower portion of the STN cell, a neutral gray polarizer 17 was placed so that a transmission axis thereof made an angle of 45° to the aligned direction of the liquid crystal molecules on the lower substrate 11 ($\beta_2 = 45°$). Further, below the polarizer, a backlight using a cold cathode tube was arranged. The compensation plate, 8+9, placed on the liquid crystal cell, which constitutes the feature of the present invention, were arranged so that the direction x made an angle of 90° (δ) to a rubbing direction of the upper substrate 21. Above the compensation plate, a neutral gray polarizer 27 was disposed so that the transmission axis thereof made an angle of 45° to the direction x of the polarizer ($\beta_1 = 45°$).

The liquid crystal display device constituted as described above was black in color when a voltage was not applied and turned white upon application of a voltage and it showed less color change depending on the viewing angle direction and had excellent viewing angle characteristics.

EXAMPLE 4

An acrylic liquid crystalline polymer having a repeating unit represented by the formula (2) was placed between glass substrates each equipped with a transparent electrodes and then heated to 220° C., at which the liquid crystalline polymer showed a nematic phase. A rectangular waveform at a frequency of 50 Hz and at a voltage of 50 V was applied between upper and lower electrodes while maintaining the temperature at 220° C. and then they were quenched to a room temperature. The thickness of the liquid crystalline polymer film was about 2 μm. It was confirmed by conoscopic observation using a polarization microscope that the liquid crystalline polymer was aligned in a direction perpendicular to the substrate.

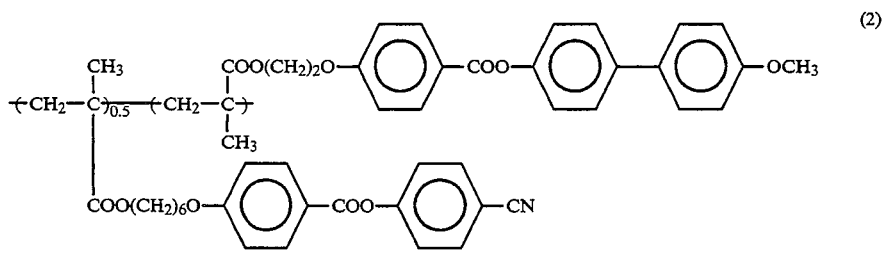
(2)

Melting point: 60° C.
Nematic-isotropic transition temperature: 227° C.

A liquid crystal display device was prepared in the same procedures as those in Example 1 except for using a compensation plate in which the liquid crystalline polymer film described above was superimposed on a phase plate made of a stretched polycarbonate film having refractive indexes of $n_x = 1.589$, $n_y = 1.582$ and $n_z = 1.581$ and retardation of $(n_x - n_y) \times d = 580$ nm.

The liquid crystal display device constituted as above was black in color when a voltage was not applied and turned white upon application of a voltage and it showed less color change depending on the viewing angle direction and had excellent viewing angle characteristics.

COMPARATIVE EXAMPLE

The measured result of the viewing angle dependence of retardation of the plate using a stretched polycarbonate film only was large as shown with B and b in FIG. 5. B shows a retardation observed from a direction x of the compensation plate, while b represents that of observed from a direction y of the plate.

When a liquid crystal display device was prepared in the same procedures as those in Example 1 except for using only the stretched polycarbonate film as a compensation plate, although black and white display could be observed from the front side, coloration occurred at a viewing angle of larger than 30° and a liquid crystal display device obtained had extremely narrow viewing angle.

What is claimed is:

1. A liquid crystal display device comprising
a liquid crystal cell comprising (a) a pair of substrates each provided with transparent electrodes and (b) a liquid crystal layer positioned between the substrates;
polarizers disposed on opposite sides of the cell; and
a compensation plate disposed between at least one of the polarizers and the cell, wherein
at least one layer of said compensation plate is an aligned film consisting essentially of a polysiloxane type liquid crystalline polymer having a repeating unit represented by the formula (XIX)

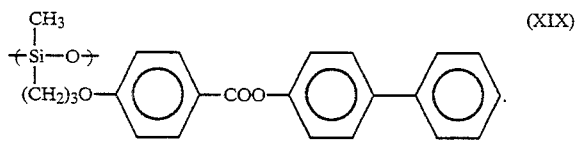

(XIX)

2. The liquid crystal display device according to claim 1, wherein said at least one layer of said compensation plate comprises a polymer film prepared by aligning a group showing liquid crystalline property of a liquid crystalline polymer in a direction perpendicular to a plane of the layer.

3. The liquid crystal display device according to claim 2, wherein said compensation plate comprises at least a liquid crystalline polymer film prepared by aligning a group showing liquid crystalline property of a liquid crystalline polymer in a direction perpendicular to a plane of the plate and an aligned film prepared by monoaxially stretching an optional stretchable polymer film, in which the refractive index in a direction perpendicular to the plane is between the maximum refractive index and the minimum refractive index within the plane.

4. The liquid crystal display device according to claim 3, wherein said liquid crystalline polymer film is monoaxially stretched along to a plans of the film so that a refractive index in a direction perpendicular to the plane is between the maximum refractive index and the minimum refractive index within the plane.

5. The liquid crystal display device according to claim 1, wherein said compensation plate is comprised a solid phase polymer film obtained by heating a liquid crystalline polymer film to a liquid crystal phase forming temperature, aligning a group exhibiting liquid crystalline property of the liquid crystalline polymer substantially perpendicular to the plane of the film by an external power field and quenching the same.

6. The liquid crystal display device according to claim 5, wherein said external power field is an electric field.

7. The liquid crystal display device according to claim 5, wherein said external power field is an magnetic field.

8. The liquid crystal display device according to claim 1, wherein said compensation plate is comprised a solid phase polymer film obtained by heating a liquid crystalline polymer film to a liquid crystal phase forming temperature, aligning a group exhibiting liquid crystalline property of the liquid crystalline polymer substantially perpendicular to the plane of the film by using a homeotropically aligning agent.

9. The liquid crystal display device according to claim 1, wherein a liquid crystal transition temperature of said liquid crystalline polymer is not lower than 60° C.

* * * * *